United States Patent
Kitamura

(10) Patent No.: US 10,666,173 B2
(45) Date of Patent: May 26, 2020

(54) MOTOR CONTROL DEVICE, SHEET CONVEYING DEVICE, DOCUMENT FEEDING DEVICE, DOCUMENT READING DEVICE, AND IMAGE FORMING APPARATUS

(71) Applicant: CANON KABUSHIKI KAISHA, Tokyo (JP)

(72) Inventor: Shingo Kitamura, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/146,917

(22) Filed: Sep. 28, 2018

(65) Prior Publication Data
US 2019/0103827 A1    Apr. 4, 2019

(30) Foreign Application Priority Data
Oct. 4, 2017  (JP) .................................. 2017-194431

(51) Int. Cl.
*H02P 8/00*    (2006.01)
*H02P 8/12*    (2006.01)
*G03G 15/00*   (2006.01)

(52) U.S. Cl.
CPC ........... *H02P 8/12* (2013.01); *G03G 15/6529* (2013.01); *G03G 15/80* (2013.01)

(58) Field of Classification Search
CPC .................................. H02P 21/22; H02P 8/12
See application file for complete search history.

(56) References Cited

U.S. PATENT DOCUMENTS

2019/0128176 A1 *   5/2019   Howell ................. F01N 3/2066

FOREIGN PATENT DOCUMENTS

| JP | 2001-025282 A | 1/2001 |
| JP | 2005-039955 A | 2/2005 |
| JP | 2006-136064 A | 5/2006 |
| JP | 2010-263746 A | 11/2010 |
| JP | 2013-207973 A | 10/2013 |
| JP | 2016-220407 A | 12/2016 |
| JP | 2017-046543 A | 3/2017 |

* cited by examiner

*Primary Examiner* — Karen Masih
(74) *Attorney, Agent, or Firm* — Canon USA, Inc., IP Division

(57) ABSTRACT

A motor control device includes a detector, a phase determiner, a controller, and an outputter. The detector detects a drive current. The phase determiner determines a rotation phase of a rotator based on the detected drive current. The controller is configured to perform control in a first mode for controlling the drive current based on a torque current component and in a second mode for controlling the drive current based on a current having a predetermined magnitude. The outputter outputs a signal indicating a value of the excitation current component of the drive current is equal to or smaller than a threshold value when the value of the detected drive current is equal to or smaller than the threshold value in a condition that the second mode is executed and a value corresponding to the rotating speed of the rotator is larger than a predetermined value.

26 Claims, 11 Drawing Sheets

MOTOR CONTROL DEVICE, SHEET CONVEYING DEVICE, DOCUMENT FEEDING DEVICE, DOCUMENT READING DEVICE, AND IMAGE FORMING APPARATUS

BACKGROUND OF THE INVENTION

Field of the Invention

One disclosed aspect of the embodiments relates to a motor step-out detection in a motor control device, a sheet conveying device, a document feeding device, a document reading device, and an image forming apparatus.

Description of the Related Art

Conventionally, as a method to control a motor, there is a known control method called a constant current control for controlling a motor by supplying an electric current having a previously determined magnitude to a winding of the motor.

In the constant current control, since a current having a previously determined magnitude is supplied to the winding of the motor regardless of an actual rotating condition of a rotator, a load torque applied to the rotator may exceed an output torque corresponding to a drive current supplied to the winding and the motor may be in a step-out state.

Japanese Patent Laid-Open No. 2010-263746 describes a configuration that a vibration sensor for detecting vibration is provided at a frame that fixes a bearing of a rotary shaft of the motor and a step-out state is determined based on a detection result of the vibration sensor.

According to Japanese Patent Laid-Open No. 2010-263746, the vibration sensor for detecting whether or not the motor rotation is abnormal needs to be provided, which leads an increase in cost.

SUMMARY OF THE INVENTION

In view of the above problem, one aspect of the embodiments has an object to determine whether or not the motor rotation is abnormal with an inexpensive configuration. A motor control device according to the disclosure includes a detector, a phase determiner, a controller, and an outputter. The detector is configured to detect a drive current flowing in a winding of a motor. The phase determiner is configured to determine a rotation phase of a rotator of the motor based on the drive current detected by the detector. The controller is configured to perform control in a first mode for controlling the drive current flowing in the winding based on a torque current component so that deviation between an instructed phase indicating a target phase of the rotator and the rotation phase determined by the phase determiner becomes small, and in a second mode for controlling the drive current flowing in the winding based on a current having a predetermined magnitude. The torque current component is a current component represented in a rotating coordinate system based on the rotation phase of the rotator and is a current component that generates a torque in the rotator. The outputter is configured to output a signal. The signal indicates that a value of an excitation current component of the drive current is equal to or smaller than a threshold value, when the value of the excitation current component of the drive current detected by the detector is equal to or smaller than the threshold value in a condition that the second mode is executed and a value corresponding to the rotating speed of the rotator is larger than a predetermined value. The excitation current component is a current component represented in the rotating coordinate system and is a current component that affects an intensity of a magnetic flux passing through the winding.

Further features of the disclosure will become apparent from the following description of exemplary embodiments (with reference to the attached drawings).

DESCRIPTION OF THE EMBODIMENTS

In the following, preferred embodiments of the disclosure will be described with reference to the drawings. It is noted that shapes of components described in the embodiments and relative placements thereof should be changed according to need based on a configuration of a device to which the disclosure is applied and various conditions, and the following embodiments are not provided to limit the scope of the disclosure. Here, the following description is given as considering a case that a motor control device is provided in an image forming apparatus; however, a device to which the motor control device is provided is not limited to the image forming apparatus. For example, the motor control device is also used in a sheet conveying device, which conveys a sheet such as a recording medium or a document sheet.

(First Embodiment)

[Image Forming Apparatus]

Figure 1:
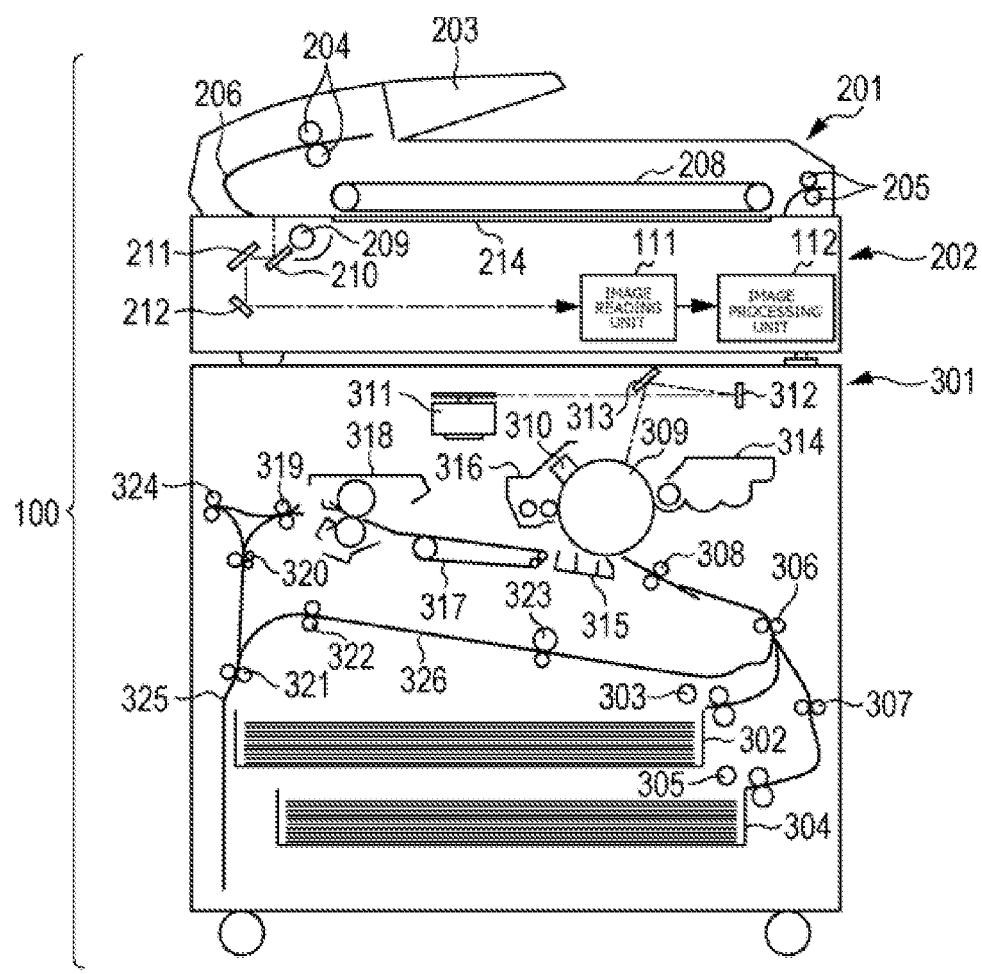
FIG. 1 is a sectional view for explaining an image forming apparatus according to a first embodiment.

FIG. 1 is a sectional view illustrating a configuration of a monochrome electrophotographic copy machine (hereinafter referred to as an image forming apparatus) 100 having a sheet conveying device according to the present embodiment. It is noted that the image forming apparatus is not limited to the copy machine and may be, for example, a facsimile machine, a printing machine, a printer, or the like. Further, the recording method is not limited to the electrophotographic system and may be an ink-jet system, or the like, for example. In addition, the system of the image forming apparatus may be a monochrome or color system.

Hereinafter, with reference to FIG. 1, the configuration and function of the image forming apparatus 100 will be described. The image forming apparatus 100 includes a document feeding device 201, a reading device 202, and an image printing device 301.

Document stacked on a document stacking unit 203 of the document feeding device 201 is fed one by one by feed rollers 204 and conveyed via a conveyance guide 206 to a document glass 214 of the reading device 202. Further, the document is conveyed by a conveyance belt 208 at a constant speed and discharged outside the device by discharge rollers 205. At a reading position in the reading device 202, a reflected light from a document image illuminated by an illuminating light 209 is led to an image reading unit 111 by an optical system formed of reflection mirrors 210, 211, and 212 and converted into an image signal by the image reading unit 111. The image reading unit 111 is composed of a lens, a CCD as a photoelectric conversion element, a drive circuit of a CCD, and the like. Various correction processes are performed on the image signal output from the image reading unit 111 by an image processing unit 112, which is composed of a hardware device such as an ASIC, and then the image signal is output to the image printing device 301. In this manner, the document is read. In other words, the document feeding device 201 and reading device 202 serve as a document reading device.

As document reading modes, there are a first reading mode and a second reading mode. The first reading mode is a mode in which an image of the document conveyed at a constant speed is read by the illuminating light 209 and optical system, which are fixed at a predetermined position. The second reading mode is a mode in which an image of the document placed on the document glass 214 of the reading device 202 is read by the illuminating light 209 and optical system, which move at a constant speed. In general, the image on the sheet-type document is read in the first reading mode and the image of a bound document is read in the second reading mode.

Inside the image printing device 301, there are sheet storage trays 302 and 304. The sheet storage trays 302 and 304 respectively store different types of recording media. For example, A4 regular paper is stored in the sheet storage tray 302 and A4 thick paper is stored in the sheet storage tray 304. Here, the recording medium is a medium on which an image is formed by the image forming apparatus, and the recording medium may be a sheet of paper, a resin sheet, a piece of cloth, an OHP sheet, a label, and the like, for example.

The recording medium stored in the sheet storage tray 302 is fed by a feed roller 303 and sent to registration rollers 308 by conveyance rollers 306. Further, the recording medium stored in the sheet storage tray 304 is fed to a feed roller 305 and sent to the registration rollers 308 by the conveyance rollers 307 and 306.

The image signal output from the reading device 202 is input to an optical scanning device 311 including a semiconductor laser and a polygon mirror. Further, a photoconductive drum 309 has an outer peripheral surface which is charged by a charging device 310. After the outer surface of the photoconductive drum 309 is charged, a laser light corresponding to the image signal input to the optical scanning device 311 from the reading device 202 is radiated on the outer peripheral surface of the photoconductive drum 309 from the optical scanning device 311 via a polygon mirror and mirror 312, 313. As a result, an electrostatic latent image is formed on the outer peripheral surface of the photoconductive drum 309.

Next, the electrostatic latent image is developed with toner in a development unit 314 and a toner image is formed on the outer peripheral surface of the photoconductive drum 309. The toner image formed on the photoconductive drum 309 is transferred to a recording medium by a transfer charger 315 provided at a position facing to the photoconductive drum 309 (a transfer position). Corresponding to a timing of the transfer, the registration rollers 308 send the recording medium to the transfer position.

The recording medium on which the toner image is transferred as described above is sent to a fixing unit 318 by a conveyance belt 317 and heated and pressed by the fixing unit 318, and the toner image is fixed on the recording medium. In this manner, an image is formed on the recording medium by the image forming apparatus 100.

When image forming is performed in a one-side printing mode, the recording medium which has passed through the fixing unit 318 is discharged to an unillustrated discharge tray by discharge rollers 319 and 324. Further, when image forming is performed in a double sided printing mode, after the fixing unit 318 performs a fixing process on a first side of the recording medium, the recording medium is conveyed to a reverse path 325 by the discharge rollers 319, conveyance rollers 320, and reverse rollers 321. After that, the recording medium is again conveyed to the registration roller 308 by the conveyance rollers 322 and 323 and an image is formed on a second face of the recording medium with the above described method. Then, the recording medium is discharged to the unillustrated discharge tray by the discharge rollers 319 and 324.

Further, when the recording medium having an image formed on its first face is discharged outside the image forming apparatus 100 in a manner that the first face is facing downward, the recording medium which has passed through the fixing unit 318 is conveyed through the discharge roller 319 in a direction toward the conveyance rollers 320. After that, since the conveyance rollers 320 rotate backwards immediately before a rear end of the recording medium passes through a nip section of the conveyance rollers 320, the recording medium is discharged outside the image forming apparatus 100 via the discharge rollers 324 in a manner that the first face of the recording medium is facing down.

The configuration and function of the image forming apparatus 100 have been described. Here, a load according to an embodiment is a subject to be driven by a motor. For example, the various rollers (conveyance rollers) such as the feed rollers 204, 303 and 305, registration rollers 308, and discharge rollers 319, photoconductive drum 309, conveyance belts 208, 317, the illuminating light system 209, optical system, and the like are the load in the embodiment. A motor control device according to the present embodiment can be applied to the motor that drives those loads.

Figure 2:
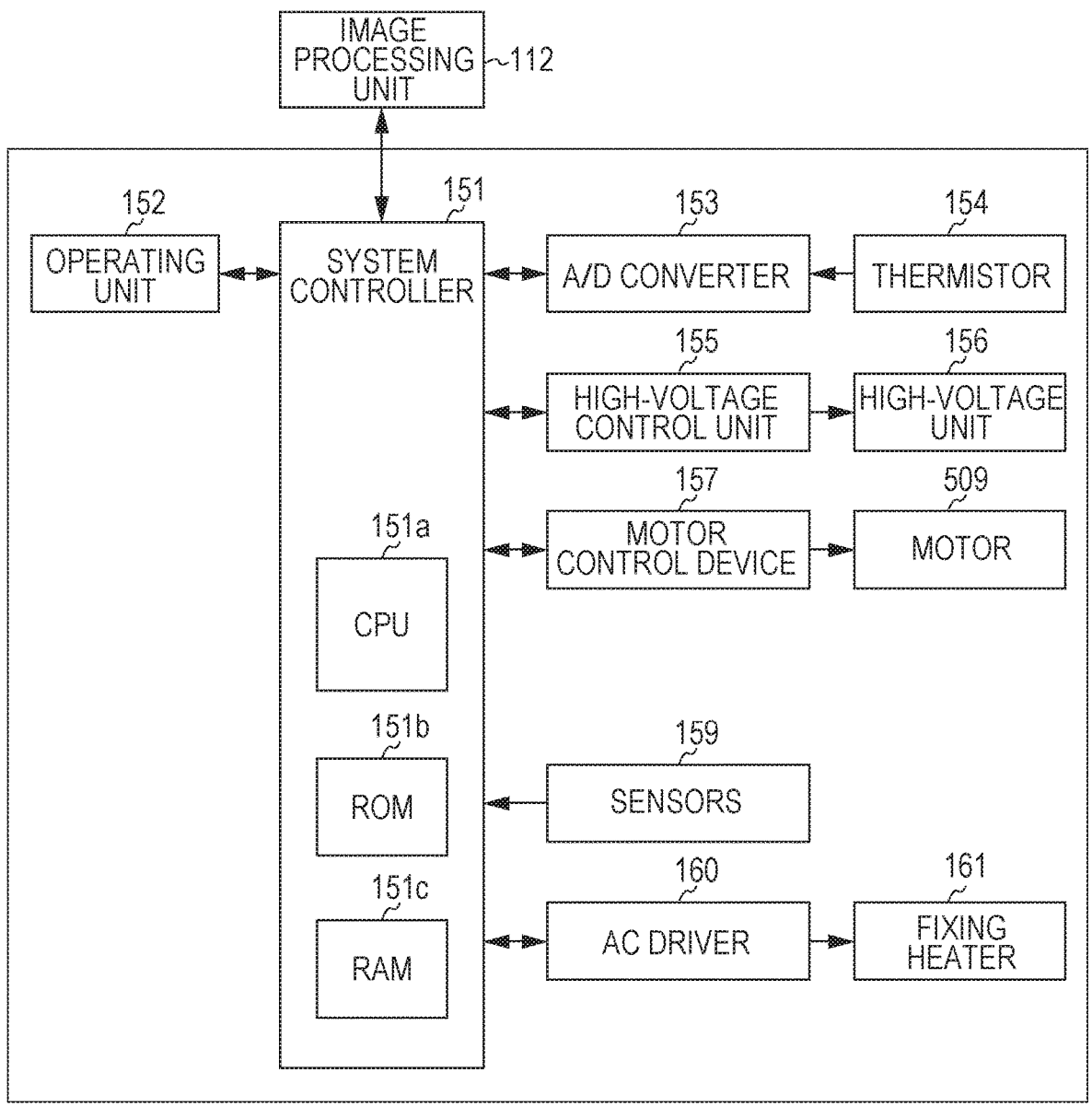
FIG. 2 is a block diagram illustrating a control configuration of the image forming apparatus.

FIG. 2 is a block diagram illustrating an example of a control configuration of the image forming apparatus 100. A system controller 151 includes a CPU 151a, a ROM 151b, and a RAM 151c as illustrated in FIG. 2. Further, the system controller 151 is connected to the image processing unit 112, an operating unit 152, an analog/digital (A/D) converter 153, a high-voltage control unit 155, a motor control device 157, sensors 159, and an AC driver 160. The system controller 151 can transmit and receive data and a command to and from the respective connected units.

The CPU 151a performs predetermined various sequences related to the image forming sequence by reading and executing various programs stored in the ROM 151b.

The RAM 151c is a memory device. In the RAM 151c, for example, various types of data such as a setting value for the high-voltage control unit 155, an instruction value for the motor control device 157, and information received from the operating unit 152, are stored.

The system controller 151 transmits, to the image processing unit 112, setting value data of various devices provided in the image forming apparatus 100, which is needed in image processing in the image processing unit 112. Further, the system controller 151 receives signals from the sensors 159 and sets a setting value of the high-voltage control unit 155 based on the received signals.

The high-voltage control unit 155 supplies voltage necessary for a high-voltage unit 156 (the charging unit 310, development unit 314, transfer charger 315, and the like) according to the setting value, which is set by the system controller 151. Here, in the sensors 159, there is a sensor that detects a recording medium conveyed by the conveyance roller, for example.

The motor control device 157 controls the motor 509 according to an instruction output from the CPU 151a. Here, in FIG. 2, only the motor 509 is illustrated as the motor that drives the load; however, in actual, the image forming apparatus includes a plurality of motors. Further, a single motor control device may control the plurality of motors. In addition, in FIG. 2, only a single motor control device is provided in the image forming apparatus; however, in actual, a plurality of motor control devices are provided in the image forming apparatus.

The A/D converter 153 receives a detection signal detected by a thermistor 154 that detects temperature of a fixing heater 161 and transmits the detection signal to the system controller 151 after converting from an analog signal to a digital signal. The system controller 151 controls the AC driver 160 based on the digital signal received from the A/D converter 153. The AC driver 160 controls the fixing heater 161 so that the temperature of the fixing heater 161 becomes a temperature needed to perform a fixing process. Here, the fixing heater 161 is a heater used in the fixing process and included in the fixing unit 318.

The system controller 151 controls the operating unit 152 to display an operation screen used by the user to set a type of a recording medium to be used, for example, on a display unit provided to the operating unit 152. The system controller 151 controls an operation sequence of the image forming apparatus 100 based on information set by the user. Further, the system controller 151 transmits, to the operating unit 152, information indicating a status of the image forming apparatus. Here, the information indicating a status of the image forming apparatus is information related to the number of sheets for image formation, a progress of image forming operation, a sheet jam or double feeding in the document reading device 201 and image printing device 301, for example. The operating unit 152 displays information received from the system controller 151 on the display unit.

As described above, the system controller 151 controls the operation sequence of the image forming apparatus 100.

[Motor Control Device]

<Vector Control>

Next, the motor control device 157 according to the present embodiment will be described. The motor control device 157 can control the motor by any of control methods of a vector control as a first mode and a constant current control as a second mode. Here, the motor according to the present embodiment does not include a sensor such as a rotary encoder for detecting a rotation phase of the rotator of the motor.

Firstly, with reference to FIGS. 3 and 4, a method that the motor control device 157 performs the vector control will be described.

Figure 3:
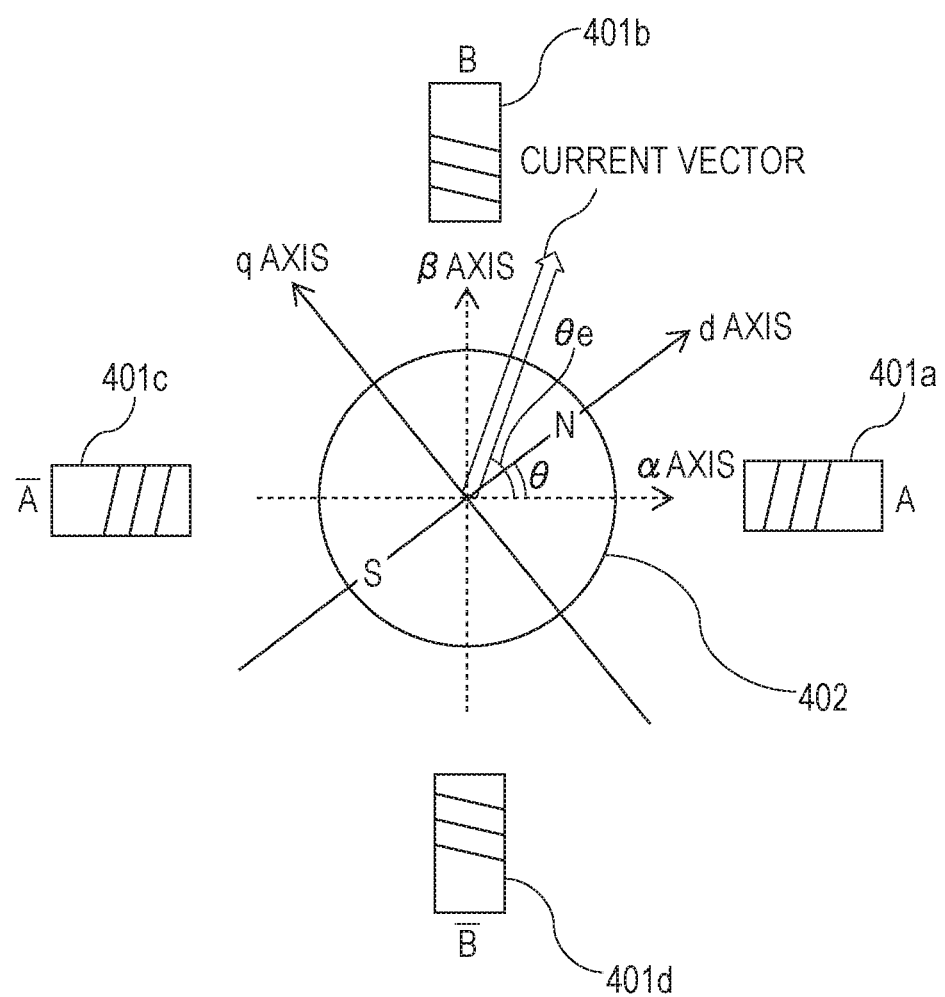
FIG. 3 is a diagram illustrating a relationship between a motor, which is composed of two phases including an A phase and a B phase, and a rotating coordinate system expressed with a d axis and a q axis.

FIG. 3 is a diagram illustrating a relationship between a stepping motor (hereinafter, referred to as a motor) 509, which is composed of two phases including the A phase (first phase) and the B phase (second phase), and a rotating coordinate system expressed with the d axis and the q axis. In FIG. 3, in a stationary coordinate system, an α axis, which is an axis corresponding to a winding of the A phase, and a β axis, which is an axis corresponding to a winding of the B phase, are defined. Further, in FIG. 3, a d axis is defined along a direction of a magnetic flux generated by a magnetic pole of a permanent magnet used in the rotator 402, and a q axis is defined along a direction turned 90 degrees from the d axis in a counterclockwise direction (a direction orthogonal to the d axis). The angle made by the α axis and d axis is defined by θ and the rotation phase of the rotator 402 is expressed with the angle θ. In the vector control, a rotating coordinate system based on the rotation phase θ of the rotator 402 is used. More specifically, in the vector control, a q axis component (torque current component) that generates torque in the rotator and a d axis component (excitation current component) that affects an intensity of the magnetic flux running through the winding are used, the q axis component and the d axis component are current components of current vector corresponding to the drive current flowing in the winding and are current components in the rotating coordinate system.

The vector control is a control method for controlling the motor by performing a phase feedback control that controls a value of the torque current component and a value of the excitation current component so that deviation between an instructed phase that expresses a target phase of the rotator and an actual rotation phase becomes small. Further, there may be a method for controlling the motor by performing a speed feedback control that controls the value of the torque current component and the value of the excitation current component so that the deviation between the instructed speed representing the target speed of the rotator and the actual rotating speed becomes small.

Figure 4:
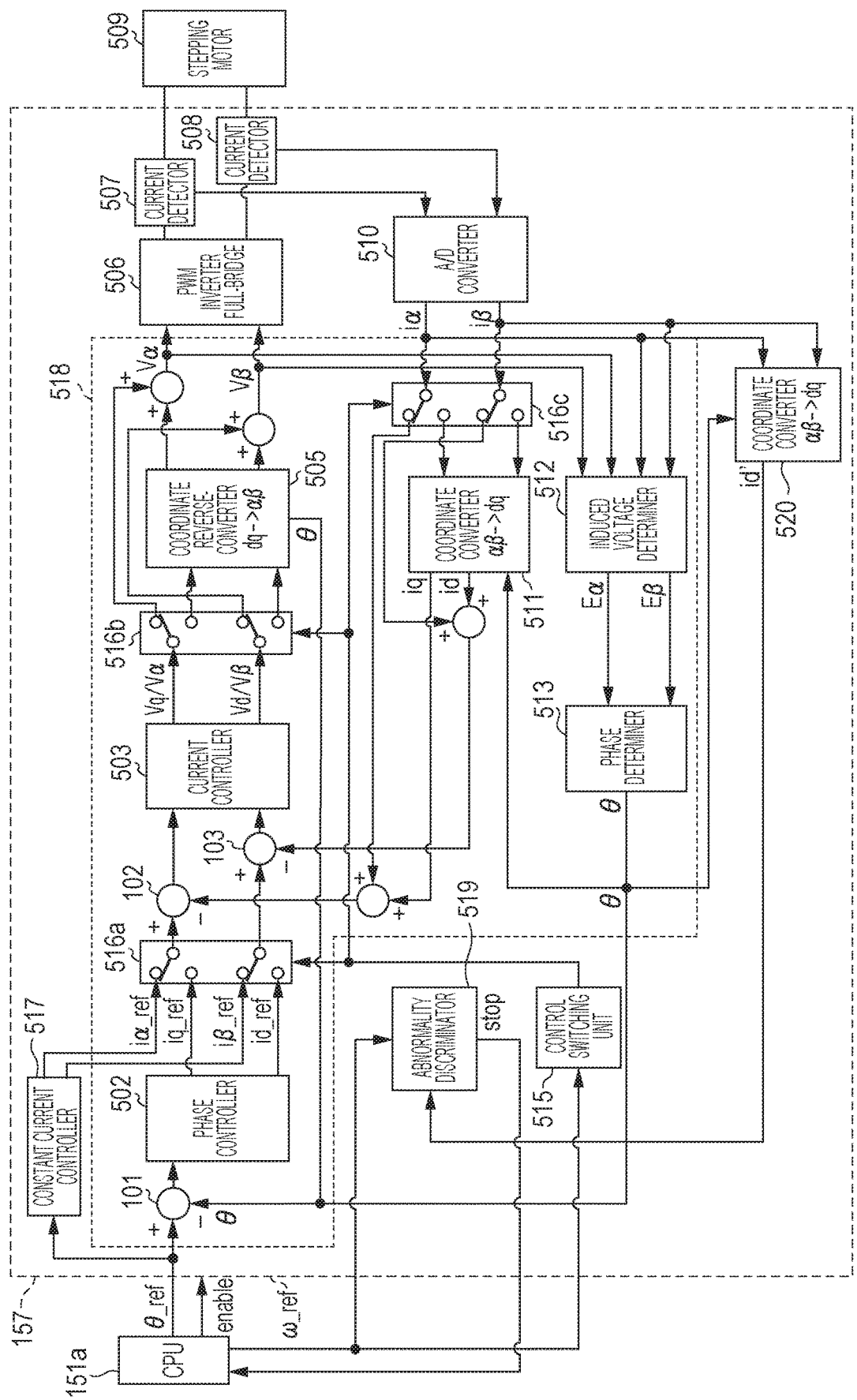
FIG. 4 is a block diagram illustrating a configuration of a motor control device according to the first embodiment.

FIG. 4 is a block diagram illustrating an example of a configuration of the motor control device 157 that controls the motor 509. Here, the motor control device 157 is composed of at least a single ASIC and performs each function described below.

As illustrated in FIG. 4, the motor control device 157 includes a constant-current controller 517 that performs a constant current control and a vector controller 518 that performs a vector control. Further, the motor control device 157 has a configuration for switching whether to use the constant-current controller 517 to control the drive of the motor 509 or to use the vector controller 518 to control the drive of the motor 509, based on the instructed speed of the rotator 402. More specifically, the motor control device 157 includes a control switching unit 515 and control switchers 516a, 516b, and 516c (hereinafter, referred to as switches).

The motor control device 157 includes a phase controller 502, a current controller 503, a coordinate reverse-converter 505, a coordinate converter 511, a PWM inverter 506, and the like, as circuits to perform a vector control. The coordinate converter 511 converts the current vector corresponding to the drive current flowing in the windings of the A phase and B phase of the motor 509 from a stationary coordinate system expressed with the α axis and β axis into a rotating coordinate system expressed with the q axis and d axis. As a result, the current vector corresponding to the drive current supplied to the windings of the A phase and B phase in the motor 509 is expressed by a value of the q axis component (q axis current) and a value of the d axis component (d axis current) in the rotating coordinate system. Here, the q axis current corresponds to torque current that generates torque in the rotator 402 of the motor 509. Further, the d axis current corresponds to an excitation current that affects the intensity of the magnetic flux that passes through the winding of the motor 509. The motor control device 157 can control the q axis current and d axis current respectively. As a result, the motor control device 157 can efficiently generate torque necessary for rotation of the rotator 402. In other words, in the vector control, a magnitude of the current vector illustrated in FIG. 3 changes according to load torque applied to the rotator 402.

The motor control device 157 determines a rotation phase θ of the rotator 402 in the motor 509 with a later described method and performs a vector control based on the determination result. The CPU 151*a* generates an instructed phase θ_ref indicating a target phase of the rotator 402 in the motor 509 and outputs the instructed phase θ_ref to the motor control device 157.

A subtractor 101 calculates a deviation between a rotation phase θ and an instructed phase θ_ref of the rotator 402 in the motor 509 and outputs the calculated deviation.

The phase controller 502 obtains the deviation output from the subtractor 101 in every predetermined period of time (for example, 200 μs). The phase controller 502 generates a q axis current instruction value iq_ref and a d axis current instruction value id_ref based on a proportional control (P), an integral control (I), and a derivative control (D) so that the deviation output from the subtractor 101 becomes small and outputs the generated q axis current instruction value iq_ref and d axis current instruction value id_ref. More specifically, the phase controller 502 generates the q axis current instruction value iq_ref and d axis current instruction value id_ref based on the P control, I control, and D control so that the deviation output from the subtractor 101 becomes zero and outputs the generated q axis current instruction value iq_ref and d axis current instruction value id_ref. Here, the P control is a control method for controlling a control target value based on a value which is proportional to deviation between an instruction value and an estimate value. Further, the I control is a control method for controlling the control target value based on a value which is proportional to time integration of deviation between an instruction value and an estimate value. Also, the D control is a control method for controlling the control target value based on a value which is proportional to an amount of change of deviation between an instruction value and an estimate value during a predetermined period of time. The phase controller 502 according to the present embodiment generates a q axis current instruction value iq_ref and a d axis current instruction value id_ref based on a PID control; however, this example does not set any limitation. For example, the phase controller 502 may generate the q axis current instruction value iq_ref and d axis current instruction value id_ref based on a PI control. Here, when a permanent magnet is used in the rotator 402, the d axis current instruction value id_ref, which affects the intensity of the magnetic flux passing through the winding is generally set to zero; however, this example does not set any limitation.

The drive current flowing in the windings of the A phase and B phase in the motor 509 is detected by current detectors 507 and 508, and after that, the A/D converter 510 converts the drive current from an analog value to a digital value. Here, a period that the A/D converter 510 outputs a current value is a period (for example, 25 μs), which is shorter than a period that the phase controller 502 obtains deviation from the subtractor 101 for example.

The current value of the drive current, which is converted from an analog value to a digital value by the A/D converter 510, is expressed as current values iα and iβ in the stationary coordinate system in the following equations using a phase θe of the current vector illustrated in FIG. 3. Here, the phase θe of the current vector is defined as an angle between the α axis and the current vector. Further, I represents a magnitude of the current vector.

$$i\alpha = I^* \cos \theta e \quad (1)$$

$$i\beta = I^* \sin \theta e \quad (2)$$

These current values iα and iβ are input to the coordinate converters 511 and 520, and an induced voltage determiner 512.

The coordinate converter 511 converts the current values iα and iβ in the stationary coordinate system into a current value iq of q axis current and a current value id of d axis current in the rotating coordinate system, by using the following equations.

$$id = \cos \theta^* i\alpha + \sin \theta^* i\beta \quad (3)$$

$$iq = -\sin \theta^* i\alpha + \cos \theta^* i\beta \quad (4)$$

To the subtractor 102, the q axis current instruction value iq_ref output from the phase controller 502 and the current value iq output from the coordinate converter 511 are input. The subtractor 102 calculates deviation between the q axis current instruction value iq_ref and current value iq and outputs the deviation to the current controller 503.

Further, to the subtractor 103, the d axis current instruction value id_ref output from the phase controller 502 and the current value id output from the coordinate converter 511 are input. The subtractor 103 calculates deviation between the d axis current instruction value id_ref and current value id and outputs the deviation to the current controller 503.

The current controller 503 generates drive voltages Vq and Vd based on the PID control so that the deviation becomes small respectively. More specifically, the current controller 503 generates drive voltages Vq and Vd so that the deviation becomes zero respectively and outputs the generated drive voltages Vq and Vd to the coordinate reverse-converter 505. In other words, the current controller 503 serves as a generating unit. Here, the current controller 503 according to the present embodiment generates the drive voltages Vq and Vd based on the PID control; however, this example does not set any limitation. For example, the current controller 503 may generate the drive voltages Vq and Vd based on the PI control.

The coordinate reverse-converter 505 performs reverse conversion on the drive voltages Vq and Vd in the rotating coordinate system output from the current controller 503 into drive voltages Vα and Vβ in the stationary coordinate system, by using the following equations.

$$V\alpha = \cos \theta^* Vd - \sin \theta^* Vq \quad (5)$$

$$V\beta = \sin \theta^* Vd + \cos \theta^* Vq \quad (6)$$

The coordinate reverse-converter 505 outputs the reverse-converted Vα and Vβ to the induced voltage determiner 512 and PWM inverter 506.

The PWM inverter 506 includes a full-bridge circuit. The full-bridge circuit is driven by a PWM signal based on the drive voltages Vα and Vβ, which are output from the coordinate reverse-converter 505. As a result, the PWM inverter 506 generates drive currents iα and iβ corresponding to the drive voltages Vα and Vβ and drives the motor 509 by supplying the drive currents iα and iβ to the winding of each phase in the motor 509. In other words, the PWM inverter 506 serves as a supplying unit that supplies a current to the winding of each phase in the motor 509. Here, according to the present embodiment, the PWM inverter includes a full-bridge circuit; however, the PWM inverter may include a half-bridge circuit, or the like.

Next, a determination method of a rotation phase θ of the rotator 402 will be described. In the determination of the rotation phase θ of the rotator 402, values of induced voltages Eα and Eβ induced in the winding of the A phase and B phase in the motor 509 by rotation of the rotator 402 are used. The values of induced voltages are determined (calculated) by the induced voltage determiner 512. More specifically, the induced voltages Eα and Eβ are determined by using the following equations based on the current values iα and iβ input from the A/D converter 510 to the induced voltage determiner 512 and the drive voltages Vα and Vβ input from the coordinate reverse-converter 505 to the induced voltage determiner 512.

$$E\alpha = V\alpha - R*i\alpha - L*di\alpha/dt \quad (7)$$

$$E\beta = V\beta - R*i\beta - L*di\beta/dt \quad (8)$$

Here, R represents a winding resistance and L represents a winding inductance. The values of the winding resistance R and winding inductance L are values, which are unique to the motor 509 in use and previously stored in a memory (not illustrated) or the like provided in the ROM 151b or the motor control device 157.

The induced voltages Eα and Eβ determined by the induced voltage determiner 512 are output to a phase determiner 513.

The phase determiner 513 determines a rotation phase θ of the rotator 402 in the motor 509 by using the following equation based on a ratio between the induced voltage Eα and induced voltage Eβ output from the induced voltage determiner 512.

$$\theta = \tan^{-1}(-E\beta/E\alpha) \quad (9)$$

Here, according to the present embodiment, the phase determiner 513 determines the rotation phase θ by calculating equation (9); however, this example does not set any limitation. For example, the phase determiner 513 may determine the rotation phase θ by referring to a table, which is stored in the ROM 151b or the like and indicates a relationship of the rotation phase θ corresponding to the induced voltage Eα and induced voltage Eβ, and the induced voltage Eα and induced voltage Eβ.

The rotation phase θ of the rotator 402, which is obtained as described above, is input to the subtractor 101, coordinate reverse-converter 505, and coordinate converters 511 and 520.

Here, the coordinate converter 520 converts, by using equations (3) and (4), the current values iα and iβ in the stationary coordinate system into a current value iq' of the q axis current and a current value id' of the d axis current in the rotating coordinate system. The current value id' converted by the coordinate converter 520 is output to an abnormality discriminator 519. The abnormality discriminator 519 will be described later.

The motor control device 157 repeats the above described control.

As described above, the motor control device 157 according to the present embodiment performs a vector control using a phase feedback control for controlling the current value in the rotating coordinate system so that deviation between the instructed phase θ_ref and rotation phase θ becomes small. By performing the vector control, it can be prevented that the motor becomes in a step-out state, that the motor sound increases due to a redundant torque, and that a power consumption increases. Further, by performing the phase feedback control, the rotation phase of the rotator can be controlled so that the rotation phase of the rotator becomes a desired phase. Therefore, in the image forming apparatus, an image formation on the recording medium can be properly performed by applying a vector control based on a phase feedback control to the motor that drives a load (the registration roller or the like) in which the rotation phase of the rotator needs to be accurately controlled.

<Constant Current Control>

Next, with reference to FIG. 4, the constant current control will be described. In the constant current control, the drive current that flows in the winding is controlled by supplying a current which is previously determined based on an operation sequence of the motor to the winding of the motor. In the constant current control, a drive current having an amplitude corresponding to a torque which is needed for rotation of the rotator and to which a predetermined margin is added is supplied so that the motor does not step out even when there is a change in the load torque applied to the rotator. This is because, in the constant current control, a configuration that the amplitude of the drive current is controlled based on the determined (estimated) rotation phase or a rotating speed of the rotator is not used (a feedback control is not performed) and the drive current cannot be adjusted according to a load torque applied to the rotator. Here, as the amplitude of the current is larger, the torque given to the rotator becomes larger. Further, the amplitude corresponds to the magnitude of the current vector.

In the following explanation, during the constant current control, the motor is controlled by supplying a current having an amplitude of a certain magnitude to the winding of the motor; however, this example does not set any limitation. For example, during the constant current control, the motor may be controlled by supplying a current having a previously determined amplitude to the winding of the motor according to whether the motor is accelerating or decelerating.

The CPU 151a outputs an instructed phase θ_ref to the constant-current controller 517. The constant-current controller 517 generates and outputs instruction values iα_ref and iβ_ref, which are corresponding to the instructed phase θ_ref output from the CPU 151a, of the current in the stationary coordinate system. Here, according to the present embodiment, the magnitude of the current vector corresponding to the instruction values iα_ref and iβ_ref of the current in the stationary coordinate system is always constant.

The drive current flowing in the windings of the A phase and B phase in the motor 509 is detected by the current detectors 507 and 508. The detected drive current is converted from an analog value into a digital value by the A/D converter 510 and expressed as the current values iα and iβ like in equations (1) and (2).

To the subtractor 102, the current value iα output from the A/D converter 510 and the current instruction value iα_ref output from the constant-current controller 517 are input. The subtractor 102 calculates deviation between the current instruction value iα_ref and current value iα and outputs the deviation to the current controller 503.

Further, to the subtractor 103, the current value iβ output from the A/D converter 510 and the current instruction value iβ_ref output from the constant-current controller 517 are input. The subtractor 103 calculates deviation between the current instruction value iβ_ref and current value iβ and outputs the deviation to the current controller 503.

The current controller 503 outputs drive voltages Vα and Vβ based on the PID control so that the deviation to be input becomes small. More specifically, the current controller 503 outputs the drive voltages Vα and Vβ so that the deviation to be input becomes close to zero.

The PWM inverter 506 supplies a drive current to the winding of each phase in the motor 509 based on the input drive voltages Vα and Vβ and drives the motor 509 with the above described method.

The constant current control has been described above.

<Switching Between Vector Control and Constant Current Control>

Next, a method for switching between the vector control and the constant current control will be described. As illustrated in FIG. 4, the motor control device 157 according to the present embodiment has a configuration for switching between the constant current control and the vector control. More specifically, the motor control device 157 includes the control switching unit 515 and respective switches 516a, 516b, and 516c.

Figure 5:
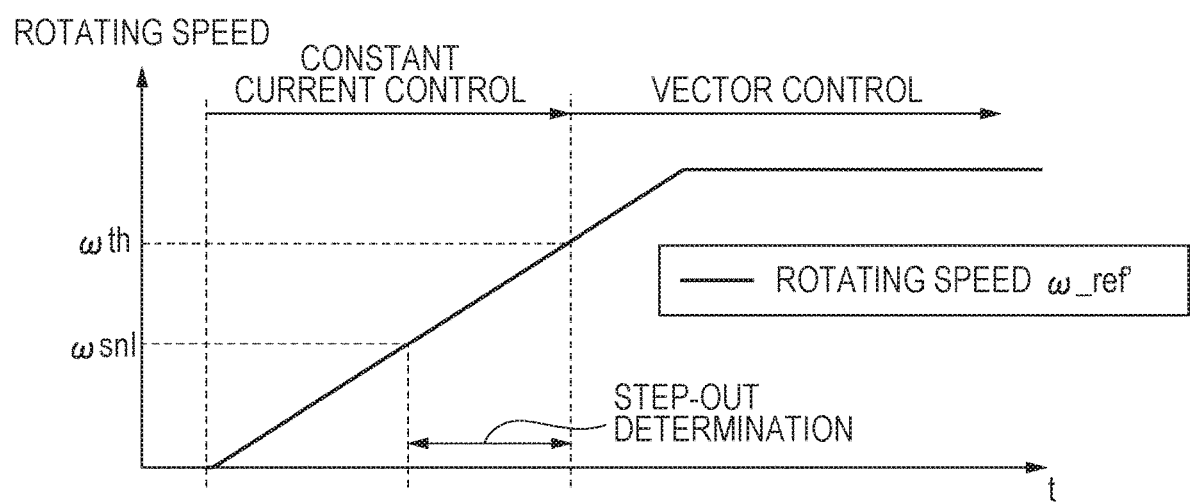
FIG. 5 is a diagram illustrating a relationship between a rotating speed $\omega\_ref$ corresponding to an instructed speed, which represents a target speed of the rotator, a threshold value $\omega th$ and a threshold value $\omega snl$.

FIG. 5 is a diagram illustrating a relationship between a rotating speed ω_ref, which corresponds to an instructed speed that represents a target speed of the rotator, a threshold value ωth, and a threshold value ωsnl. It is noted that the threshold value ωth and the threshold value ωsnl will be described later. Further, the relationship between the threshold value ωth and threshold value ωsnl illustrated in FIG. 5 is an example and this example does not set any limitation.

According to the present embodiment, the threshold value ωth of the rotating speed of the rotator 402 for switching the constant current control and vector control is set. When the motor control is switched from the constant current control to the vector control, the rotating speed of the motor may instantaneously be reduced. This is because that the magnitude of the torque, in the rotator, generated by a drive current first supplied after the motor control is switched is sometimes smaller than the magnitude of the torque, in the rotator, generated by the drive current last supplied before the motor control switches. Thus, in a case that the threshold value ωth is set to a smallest rotating speed in the rotating speed that the rotation phase is accurately determined (determinable), the motor control by the vector control becomes unstable if the rotating speed is instantaneously reduced when the motor control is switched. Thus, the threshold value ωth is set to a rotating speed larger than a rotating speed which is smallest in the rotating speeds that the rotation phase is accurately determined, considering the reduction of the rotating speed.

As illustrated in FIG. 4, the CPU 151a outputs a rotating speed ω_ref to the control switching unit 515 and abnormality discriminator 519. Here, the CPU 151a determines the rotating speed ω_ref based on a change amount in the instructed phase θ_ref during a predetermined period. In other words, the rotating speed ω_ref changes in every predetermined period of time.

During the control by the constant-current controller 517, when the rotating speed ω_ref becomes equal to or greater than the threshold value ωth (ω_ref≥ωth), the control switching unit 515 switches a controller for controlling the motor 509. In other words, the control switching unit 515 controls conditions of the respective switches 516a, 516b, and 516c to switch the controller for controlling the motor 509 from the constant-current controller 517 to the vector controller 518. As a result, a vector control by the vector controller 518 is performed. Here, the threshold value ωth is previously stored in the ROM 151b for example.

Further, during the control by the constant-current controller 517, when the rotating speed ω_ref is smaller than the threshold value ωth (ω_ref<ωth), the control switching unit 515 does not switch the controller for controlling the motor 509. In other words, the control switching unit 515 controls the conditions of the respective switches 516a, 516b, and 516c so that the condition that the motor 509 is controlled by the constant-current controller 517 is maintained. As a result, the constant current control by the constant-current controller 517 is continued.

During the control by the vector controller 518, when the rotating speed ω_ref becomes smaller than the threshold value ωth (ω_ref<ωth), the control switching unit 515 switches the controller for controlling the motor 509. In other words, the control switching unit 515 controls the conditions of the respective switches 516a, 516b, and 516c so that the controller for controlling the motor 509 switches from the vector controller 518 to the constant-current controller 517. As a result, the constant current control by the constant-current controller 517 is performed.

Further, during the control by the vector controller 518, when the rotating speed ω_ref is equal or greater than the threshold value ωth (ω_ref≥ωth), the control switching unit 515 does not switch the controller for controlling the motor 509. In other words, the control switching unit 515 controls the conditions of the respective switches 516a, 516b, and 516c so that the condition that the motor 509 is controlled by the vector controller 518 is maintained. As a result, a vector control by the vector controller 518 is continued.

<Step-out of Motor>

Figure 6C:
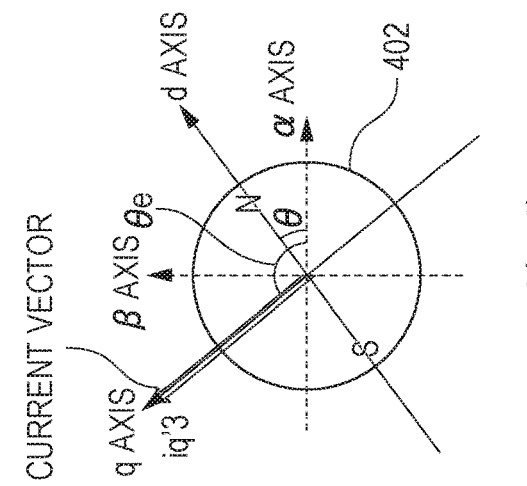
FIGS. 6A to 6C are diagrams illustrating relationships between a phase $\theta e$ of a current vector corresponding to a drive current flowing in a winding and a rotation phase $\theta$ of the rotator in a constant current control.
Figure 6B:
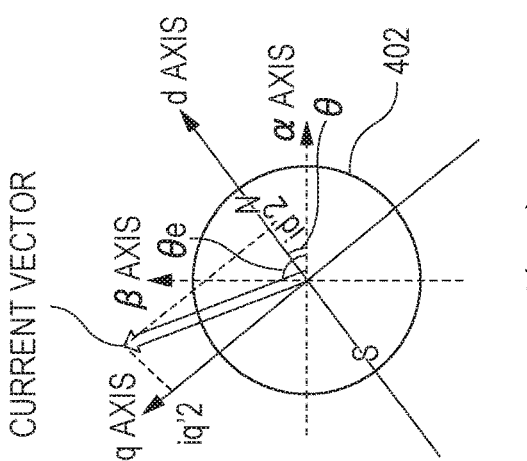
Figure 6A:
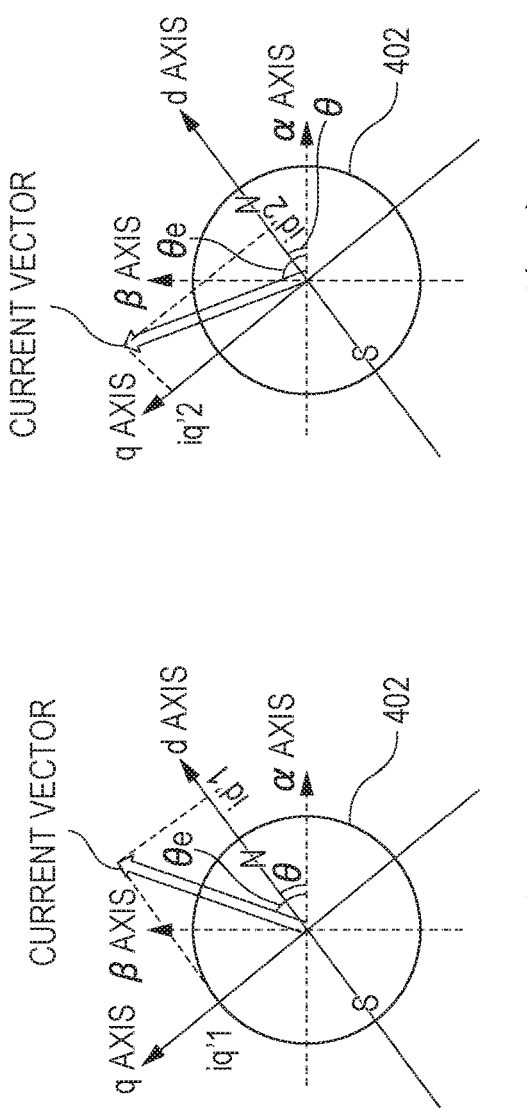

FIGS. 6A to 6C are diagrams illustrating relationships between the phase θe of the current vector corresponding to the drive current that flows in the winding and the rotation phase θ of the rotator in the constant current control. FIG. 6A is a diagram illustrating a relationship between the phase θe of the current vector and the rotation phase θ of the rotator in a condition that a load torque T applied to the rotator is T1 in the constant current control. FIG. 6B is a diagram illustrating a relationship between the phase θe of the current vector and the rotation phase θ of the rotator in a condition that the load torque T applied to the rotator is T2 which is greater than T1 in the constant current control. FIG. 6C is a diagram illustrating a relationship between the phase θe of the current vector and the rotation phase θ of the rotator in a condition that a condition that the load torque T applied to the rotator is T3 which is greater than T2 in the constant current control. Here, in FIGS. 6A to 6C, the direction of a normal rotation of the rotator is defined as an anticlockwise direction. In the following description, the configuration of a case that the rotator rotates in a normal direction will be explained; however, a configuration of a case that the rotator rotates in an opposite direction may be employed.

As described above, in the constant current control according to the present embodiment, the motor is controlled by supplying a current having a current vector of a constant magnitude to the winding of the motor. In other words, the current vectors illustrated in FIGS. 6A to 6C all have the same magnitude.

As illustrated in FIGS. 6A to 6C, the value id' of the excitation current component (the d axis current) of the current vector is expressed in the following equation (10). Further, the value iq' of the torque current component (the q axis current) of the current vector is expressed in the following equation (11). Here, $\Delta\zeta$ indicates a phase difference ($\theta e - \theta$) between the phase $\theta e$ of the current vector and the rotation phase $\theta$ of the rotator.

$$id' = I^* \cos \Delta\theta \qquad (10)$$

$$iq' = ^* \sin \Delta\theta \qquad (11)$$

As illustrated in FIGS. 6A to 6C, in the constant current control, when the load torque T applied to the rotator increases, the phase difference $\Delta\theta$ also increases. During a period that the phase difference $\Delta\theta$ is equal to or greater than zero degree and equal to or smaller than 90 degrees, as the phase difference $\Delta\theta$ increases, the value id' (the current value id') of the excitation current component of the current vector decreases and the value iq' (the current value iq') of the torque current component of the current vector increases. In the constant current control, during the period that the phase difference $\Delta\theta$ is equal to or greater than zero degree and equal to or smaller than 90 degrees, the increase of the current value iq' (the reduction of the current value id') means an increase of the load torque T applied to the rotator.

When the phase difference $\Delta\theta$ becomes 90 degrees (FIG. 6C), the current value id' becomes zero and the current value iq' becomes equal to a magnitude I of the current vector. In other words, when the phase difference $\Delta\theta$ becomes 90 degrees, the output torque of the motor becomes a maximum torque Tmax that the motor can output in the constant current control.

When the phase difference $\Delta\theta$ becomes greater than 90 degrees, it means that the load torque T applied to the rotator becomes greater than T3. In other words, when the phase difference $\Delta\theta$ becomes greater than 90 degrees, it means that the load torque T applied to the rotator becomes greater than the maximum torque Tmax that the motor can output.

A step-out of the motor is caused when the load torque T applied to the rotator exceeds the maximum torque Tmax corresponding to the drive current supplied to the winding of the motor. In other words, the fact that the phase difference $\Delta\theta$ becomes greater than 90 degrees means that the motor becomes in a step-out state.

<Stoppage Determination>

Next, a method (of a stoppage determination) for discriminating (determining) whether or not to stop driving the motor. According to the present embodiment, by applying the following configuration to the motor control device 157, the stoppage determination in the constant current control is realized. Here, in the following description, even during a period that the constant current control is being performed, the coordinate converter 520 is activated. Further, during a period that the vector control is being performed, the circuit that performs the constant current control is activated.

As illustrated in FIG. 4, the motor control device 157 according to the present embodiment includes the abnormality discriminator 519 as a configuration for discriminates whether or not to stop driving the motor. Here, a condition that the rotation of the rotator of the motor is abnormal includes a condition that the rotator is locked due to an external force or that the rotating speed is reduced due to an external force, and the like.

To the abnormality discriminator 519, the rotating speed ω_ref output from the CPU 151a and the current value id' output from the coordinate converter 520 are input. The abnormality discriminator 519 determines whether or not to stop driving the motor based on the current value id'. Here, the abnormality discriminator 519 discriminates whether or not to stop driving the motor based on the current value id' every time the current value id' is output from the coordinate converter 520 (in a cycle corresponding to a cycle that the A/D converter 510 outputs a current value).

Figure 7:
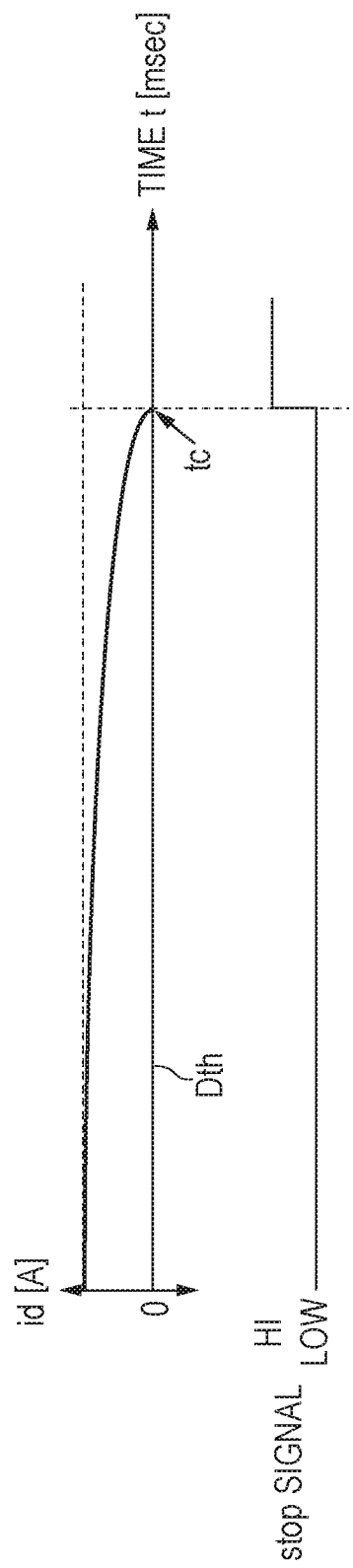
FIG. 7 is a time chart illustrating a current value id' during the constant current control.

FIG. 7 is a time chart illustrating the current values id' during the constant current control. As described in the above, when the load torque T applied to the rotator increases, the value id' of the excitation current component of the current vector (that is, the current value converted by the coordinate converter 520) decreases. Then, when the phase difference $\Delta\theta$ becomes 90 degrees, the current value id' becomes zero. Further, the fact that the phase difference $\Delta\theta$ becomes greater than 90 degrees (that is, the current value id' becomes a negative value) means that the motor becomes in a step-out state.

According to the present embodiment, when the current value id' output from the coordinate converter 520 is greater than the threshold value Dth, the abnormality discriminator 519 outputs, to the CPU 151a, a stop signal 'L (low level)' as a signal indicating that the rotation of the motor is not abnormal (that the current value id' is greater than the threshold value Dth). Further, when the current value id' output from the coordinate converter 520 is equal to or smaller than the threshold value Dth, the abnormality discriminator 519 outputs, to the CPU 151a, a stop signal 'H (high level)' as a signal indicating that the rotation of the motor is abnormal (that the current value id' is equal to or smaller than the threshold value Dth). The stop signal is a signal used to determine an activation or a stoppage of the motor control device 157 and, when the stop signal indicates 'H', the CPU 151a stops the motor control device 157. As a result, the motor stops. Further, when the stop signal indicates 'L', the CPU 151a continues to drive the motor control device 157. As a result, the motor is kept driven. Here, the abnormality discriminator 519 outputs a stop signal every time the stoppage determination is performed.

Here, according to the present embodiment, the threshold value Dth is set to zero; however, this example does not set any limitation. For example, the threshold value Dth may be set to a value which is greater than zero. By setting the threshold value Dth to a value which is equal to or greater than zero, driving of the motor can be stopped before the motor steps out. Further, the threshold value Dth may be set to a value which is smaller than zero.

To accurately calculate the d axis current, the rotation phase θ needs to be accurately determined. According to the present embodiment, the threshold value ωsnl of the rotating speed, which is used by the abnormality discriminator 519 to perform a stoppage determination, is set to a smallest rotating speed in the rotating speed that the rotation phase is accurately determined. In other words, the threshold value ωsnl is set to a value smaller than the threshold value ωth. As a result, while the control by the constant current control is being performed, the stoppage determination is executed if the rotating speed ω is equal to or greater than the threshold value ωsnl. Here, the threshold value ωsnl may not have to be the smallest rotating speed in the rotating speeds that the rotation phase is accurately determined, as long as the threshold value ωsnl is a value smaller than the threshold value ωth.

The abnormality discriminator 519 does not perform the stoppage determination when the rotating speed ω_ref is smaller than the threshold value ωsnl (ω_ref<ωsnl) and performs the stoppage determination when the rotating speed ω_ref is equal to or greater than the threshold value ωsnl (ω_ref≥ωsnl). Here, the threshold value ωsnl is previously stored in the ROM 151b for example.

Figure 8:
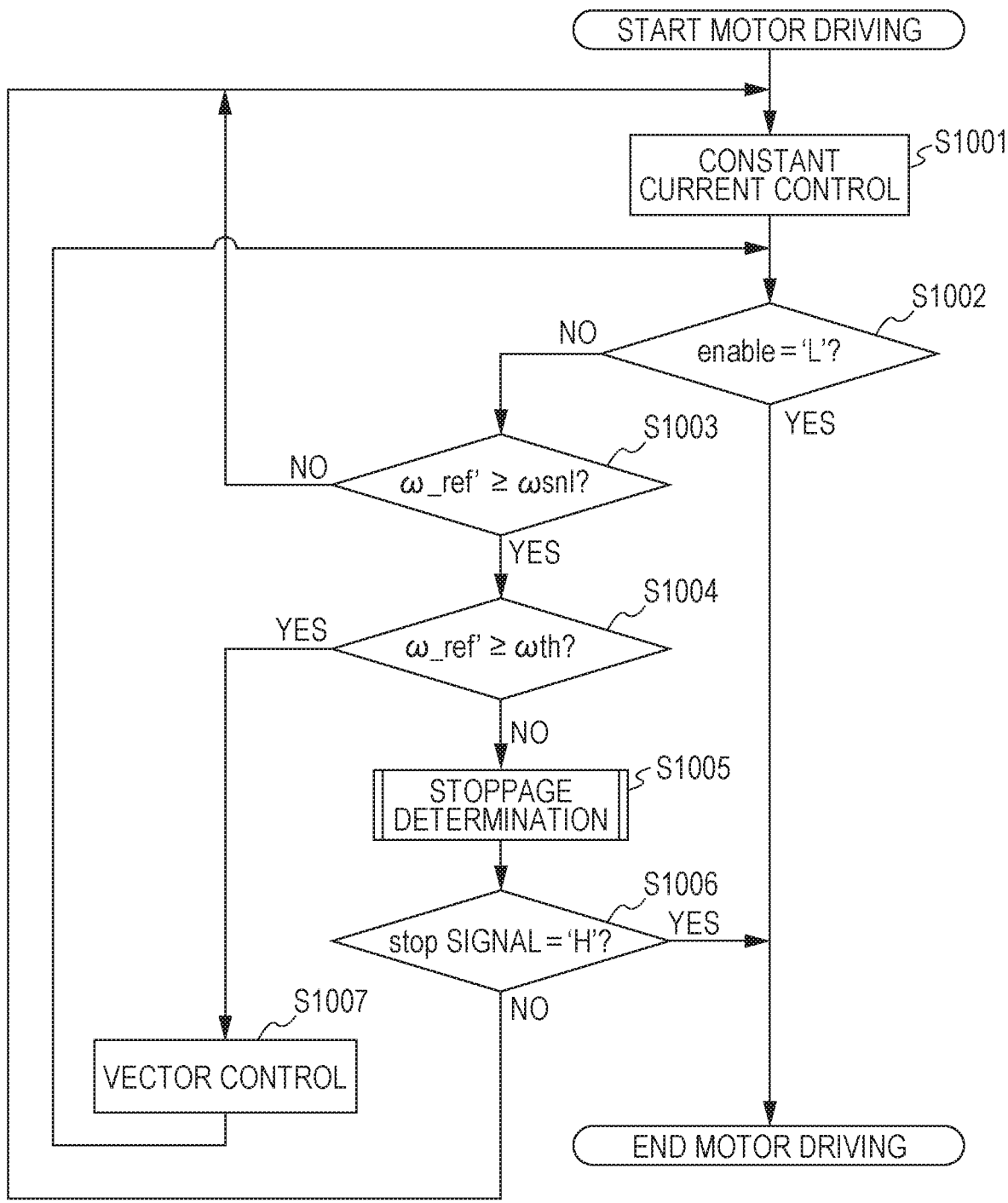
FIG. 8 is a flowchart illustrating a motor control method by the motor control device.

FIG. 8 is a flowchart illustrating a motor control method by the motor control device 157. In the following, with reference to FIG. 8, a control of the motor 509 according to the present embodiment will be described. The processes in this flowchart are executed by the motor control device 157 in response to an instruction from the CPU 151a.

Firstly, when an enable signal 'H' is output from the CPU 151a to the motor control device 157, the motor control device 157 starts to control the motor 509 according to the instruction output from the CPU 151a. The enable signal is a signal that enables or disables operation of the motor control device 157. When the enable signal is 'L (low level)', the CPU 151a disables the operation of the motor control device 157. In other words, the control of the motor 509 by the motor control device 157 is terminated. Further, when the enable signal is 'H (high level)', the CPU 151a enables the operation of the motor control device 157 and the motor control device 157 controls the motor 509 according to the instruction output from the CPU 151a.

Next, in S1001, the control switching unit 515 controls the conditions of the respective switches 516a, 516b, and 516c according to the instruction from the CPU 151a so that the driving of the motor 509 is controlled by the constant-current controller 517. As a result, the constant current control by the constant-current controller 517 is performed.

After that, in S1002, when an enable signal 'L' is output from the CPU 151a to the motor control device 157, the motor control device 157 ends driving of the motor 509.

Further, in S1002, when an enable signal 'H' is output from the CPU 151a to the motor control device 157, the motor control device 157 proceeds the process to S1003.

In S1003, when the rotating speed ω_ref is a value smaller than the threshold value ωsnl, the process returns to S1001 again and the constant current control by the constant-current controller 517 is continued.

Further, when the rotating speed ω_ref is a value equal to or greater than the threshold value ωsnl in S1003, the process proceeds to S1004.

When the rotating speed ω_ref is a value smaller than the threshold value ωth in S1004, the abnormality discriminator 519 performs a stoppage determination with the method described above in S1005.

In S1006, when the abnormality discriminator 519 outputs a stop signal 'H' to the CPU 151a, the CPU 151a outputs an enable signal 'L' from the motor control device 157. As a result, the motor control device 157 stops driving the motor 509.

Further, when the abnormality discriminator 519 outputs a stop signal 'L' to the CPU 151a in S1006, the motor control device 157 returns the process to S1001.

Further, when the rotating speed ω_ref is a value equal to or greater than the threshold value ωth in S1004, the control switching unit 515 controls the status of the respective switches 516a, 516b, and 516c so that driving of the motor 509 is controlled by the vector controller 518 in S1007. As a result, a vector control by the vector controller 518 is performed. After that, the process returns S1002 again.

After that, the motor control device 157 repeats the above described control until an enable signal 'L' is output from the CPU 151a to the motor control device 157 and controls driving of the motor 509.

Figure 9:
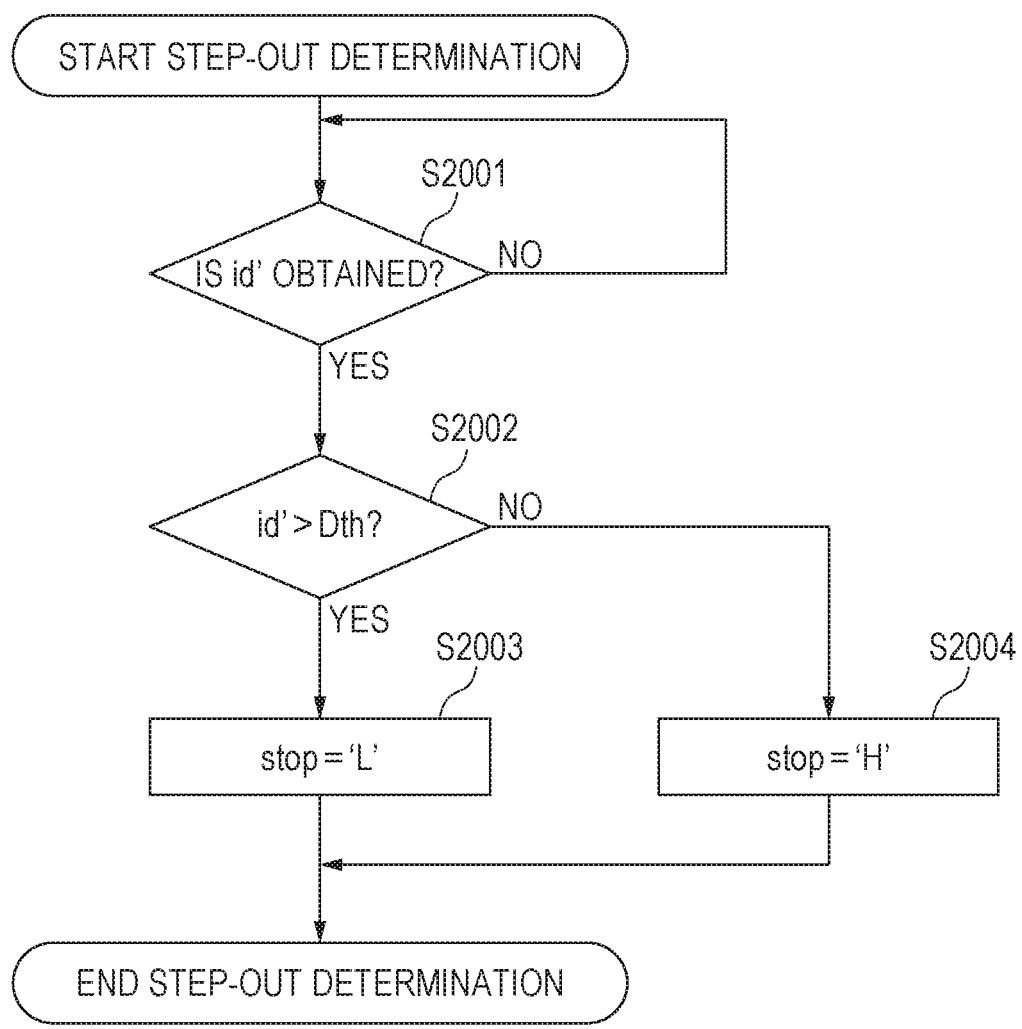
FIG. 9 is a flowchart illustrating a motor step-out determination method by an abnormality discriminator.

FIG. 9 is a flowchart illustrating the stoppage determination method of the motor 509 by the abnormality discriminator 519. In the following, with reference to FIG. 9, the stoppage determination method according to the present embodiment will be described. The processes in this flowchart are executed by the abnormality discriminator 519.

When obtaining a current value id' in S2001, the abnormality discriminator 519 proceeds the process to S2002.

When the current value id' is greater than the threshold value Dth in S2002, the abnormality discriminator 519 outputs a stop signal 'L' to the CPU 151a in S2003.

Further, when the current value id' is equal to or smaller than the threshold value Dth in S2002, the abnormality discriminator 519 outputs a stop signal 'H' to the CPU 151a in S2004.

After that, the abnormality discriminator 519 repeats the above described method every time the stoppage determination is performed. Here, during a period after the motor drive control is started and before the stoppage determination is firstly performed, a stop signal 'L' is output to the CPU 151a.

As described above, according to the present embodiment, the threshold value ωsnl is set to a smallest rotating speed in the rotating speeds that the rotation phase θ is accurately determined. In other words, the threshold value ωsnl is set to a value smaller than the threshold value ωth. As a result, the abnormality discriminator 519 can accurately perform a stoppage determination as quickly as possible during the constant current control.

Further, the abnormality discriminator 519 performs the stoppage determination according to a current value id' converted by the coordinate converter 520 based on a rotation phase θ determined by the phase determiner 513. More specifically, the abnormality discriminator 519 outputs a stop signal 'L' to the CPU 151a when the current value id' is greater than the threshold value Dth and outputs a stop signal 'H' to the CPU 151a when the current value id' is equal to or smaller than the threshold value Dth. Here, when the threshold value Dth is set to a value equal to or greater than zero, driving of the motor can be stopped before the motor steps out. As a result, it can be prevented that a noise is generated or that a power consumption increases as the motor vibrates due to supply of a current to the winding while the motor is in a step-out condition. Further, a change in the current value in the rotating coordinate system is more accurately detected compared to a change in the current value in the stationary coordinate system. In other words, as a stoppage determination is performed by using the current value id', which is a current value in the rotating coordinate system, the stoppage determination is accurately performed.

As described above, according to the present embodiment, it can be determined, with an inexpensive configuration, whether or not the motor rotation is abnormal by using the current detection configuration, which is used to control the motor to detect an abnormality of the motor rotation, without providing a sensor dedicated to detecting an abnormality of the motor rotation (whether or not the motor has stepped out, for example).

Here, according to the present embodiment, the abnormality discriminator 519 outputs a stop signal 'H' to the CPU 151a when the current value id' is equal to or smaller than the threshold value Dth; however, this example does not set any limitation. For example, there may be a configuration that the abnormality discriminator 519 outputs a stop signal 'H' to the CPU 151a when a condition that the current value id' is equal to or smaller than the threshold value Dth is kept for a second predetermined period of time. That is, driving of the motor may not be stopped even when the current value id' becomes equal to or smaller than the threshold value Dth, if the current value id' becomes greater than the threshold value Dth within the second predetermined period of time.

(Second Embodiment)

The explanation of a part of the configuration of the image forming apparatus and motor control device, which is same as that in the first embodiment, will be omitted.

According to the first embodiment, the abnormality discriminator 519 performs a stoppage determination based on a current value id' converted by the coordinate converter 520. According to the present embodiment, the abnormality discriminator 519 performs a stoppage determination based on a current value iq' converted by the coordinate converter 520.

Figure 10:
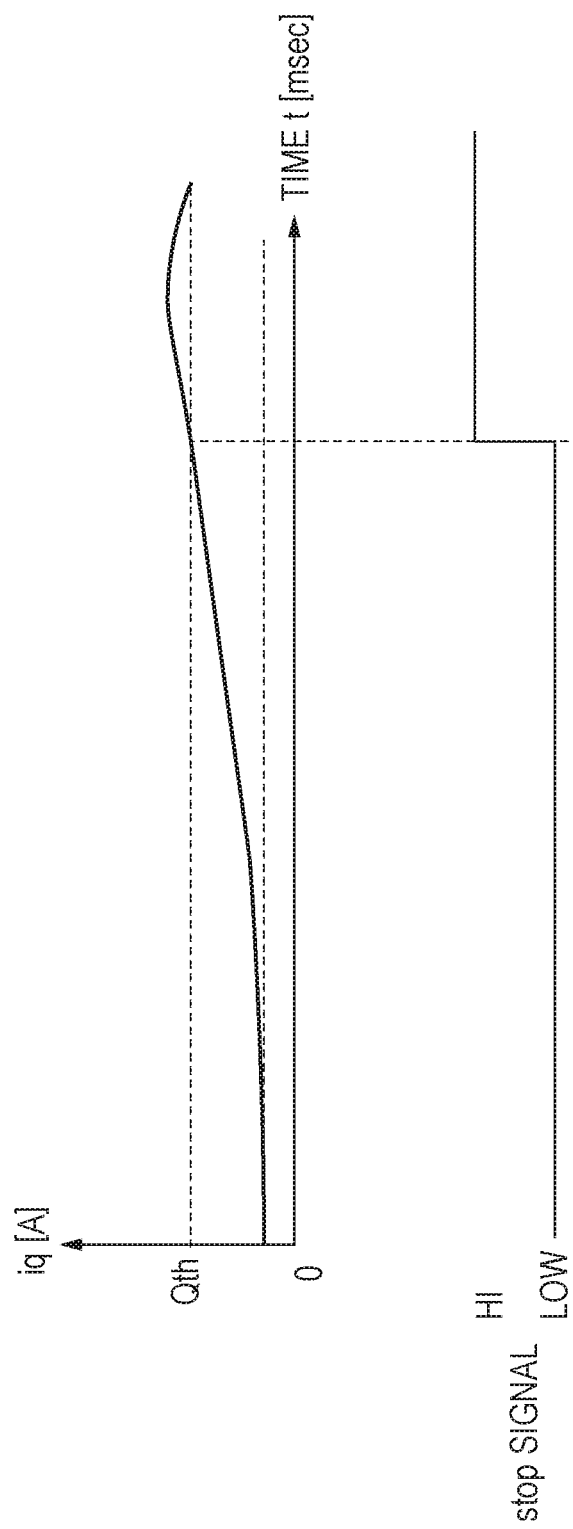
FIG. 10 is a time chart illustrating a current value iq' during the constant current control.

FIG. 10 is a time chart illustrating the current values iq' during the constant current control. As described in the first embodiment, when a load torque T applied to the rotator increases, a value of the torque current component of the current vector (that is, the current value converted by the coordinate converter 520) iq' increases. Then, when the phase difference Δθ becomes 90 degrees, the current value iq' becomes equal to a magnitude I of the current vector. Further, the fact that the phase difference Δθ becomes greater than 90 degrees means that the motor becomes in a step-out state.

According to the present embodiment, the abnormality discriminator 519 outputs a stop signal 'L' to the CPU 151a when the current value iq' converted by the coordinate converter 520 becomes smaller than the threshold value Qth. Further, the abnormality discriminator 519 outputs a stop signal 'H' to the CPU 151a when the current value iq' converted by the coordinate converter 520 changes from a value which is smaller than the threshold value Qth to a value which is equal to or greater than the threshold value Qth.

Here, the threshold value Qth is set to a positive value which is smaller than a magnitude I of the current vector.

As described above, according to the present embodiment, the threshold value ωsnl is set to a smallest rotating speed in the rotating speeds that the rotation phase θ is accurately determined. In other words, the threshold value ωsnl is set to a value smaller than the threshold value ωth. As a result, the abnormality discriminator 519 can accurately perform a stoppage determination as quickly as possible during the constant current control.

Further, the abnormality discriminator 519 performs the stoppage determination according to the current value iq' converted by the coordinate converter 520 based on the rotation phase θ which is determined by the phase determiner 513. More specifically, the abnormality discriminator 519 outputs a stop signal 'L' to the CPU 151a when the current value iq' is smaller than the threshold value Qth and outputs a stop signal 'H' to the CPU 151a when the current value iq' changes from a value, which is smaller than the threshold value Qth, to a value, which is equal to or greater than the threshold value Qth. Here, the threshold value Qth is set to a positive value which is smaller than the magnitude I of the current vector. As a result, the drive of the motor can be stopped before the motor steps out, and a noise due to vibration of the motor or a larger power consumption can be prevented. In other words, it can be prevented that the motor becomes in an abnormal driving condition. Further, a change in the current value in the rotating coordinate system is more accurately detected compared to a change in the current value in the stationary coordinate system. In other words, the stoppage determination can be accurately performed since the stoppage determination is performed by using the current value iq', which is the current value in the rotating coordinate system.

As described above, according to the present embodiment, it can be determined, with an inexpensive configuration, whether or not the motor rotation is abnormal by using the current detection configuration, which is used to control the motor to detect an abnormality of the motor rotation, without providing a sensor dedicated to detecting an abnormality of the motor rotation (whether or not the motor has stepped out, for example).

Here, according to the present embodiment, the abnormality discriminator 519 outputs a stop signal 'H' to the CPU 151a when the current value iq' changes from a value which is smaller than the threshold value Qth to a value which is equal to or greater than the threshold value Qth; however, this example does not set any limitation. For example, there may be a configuration that the abnormality discriminator 519 outputs a stop signal 'H' to the CPU 151a when the current value iq' is kept being equal to or greater than the threshold value Qth for a third predetermined period of time.

Further, according to the present embodiment, the abnormality discriminator 519 discriminates whether or not the motor is in a step-out state based on the current value iq'; however, this example does not set any limitation. For example, the abnormality discriminator 519 may discriminate whether or not the motor is in a step-out state based on a load torque applied to the rotator. Here, the abnormality discriminator 519 determines a load torque T applied to the rotator based on the following equation (13) for example.

$$T = Kq * iq' \qquad (13)$$

Here, Kq is a proportionality factor, which indicates a relationship between the load torque T and current value iq' and is a value unique to the motor. Further, the abnormality discriminator 519 may determine the torque based on a torque detector, which serves as a torque determiner and is provided in the motor for example.

Here, according to the first and second embodiments, the CPU 151a controls the motor control device 157 to terminate driving of the motor based on a stop signal output from the abnormality discriminator 519; however, this example does not set any limitation. For example, the abnormality discriminator 519 may output a signal indicating that the current value id' is equal to or smaller than the threshold value Dth when the current value id' is equal to or smaller than the threshold value Dth. Then, the CPU 151a may notify a user of information that the motor rotation is abnormal by displaying the information that the motor rotation is abnormal on a display unit provided in the operating unit 152 when a signal, which indicates that the current value id' is equal to or smaller than the threshold value Dth, is output from the abnormality discriminator 519. Further, when the current value iq' changes from a value which is smaller than the threshold value Qth to a value which is equal to or greater than the threshold value Qth, the abnormality discriminator 519 outputs a signal, which indicates that the current value iq' has changed from a value smaller than the threshold value Qth to a value which is equal to or greater than the threshold value Qth. Then, when a signal indicating that the current value iq' has changed from a value which is smaller than the threshold value Qth to a value which is equal to or greater than the threshold value Qth is output from the abnormality discriminator 519, the CPU 151$a$ may notify the user of information that the motor rotation is abnormal by displaying that the motor rotation is abnormal on the display unit provided in the operating unit 152.

Further, according to the first and second embodiments, the rotating speed ω_ref' is compared with the threshold value ωsnl and threshold value ωth; however, this example does not set any limitation. For example, the motor control device 157 may determine the rotating speed ω of the rotator by using the following equation (12) based on a change amount in the rotation phase θ output from the phase determiner 513 during a predetermined period and compare the rotating speed ω with the threshold value ωsnl and threshold value ωth.

$$\omega = d\theta/dt \quad (12)$$

Figure 11:
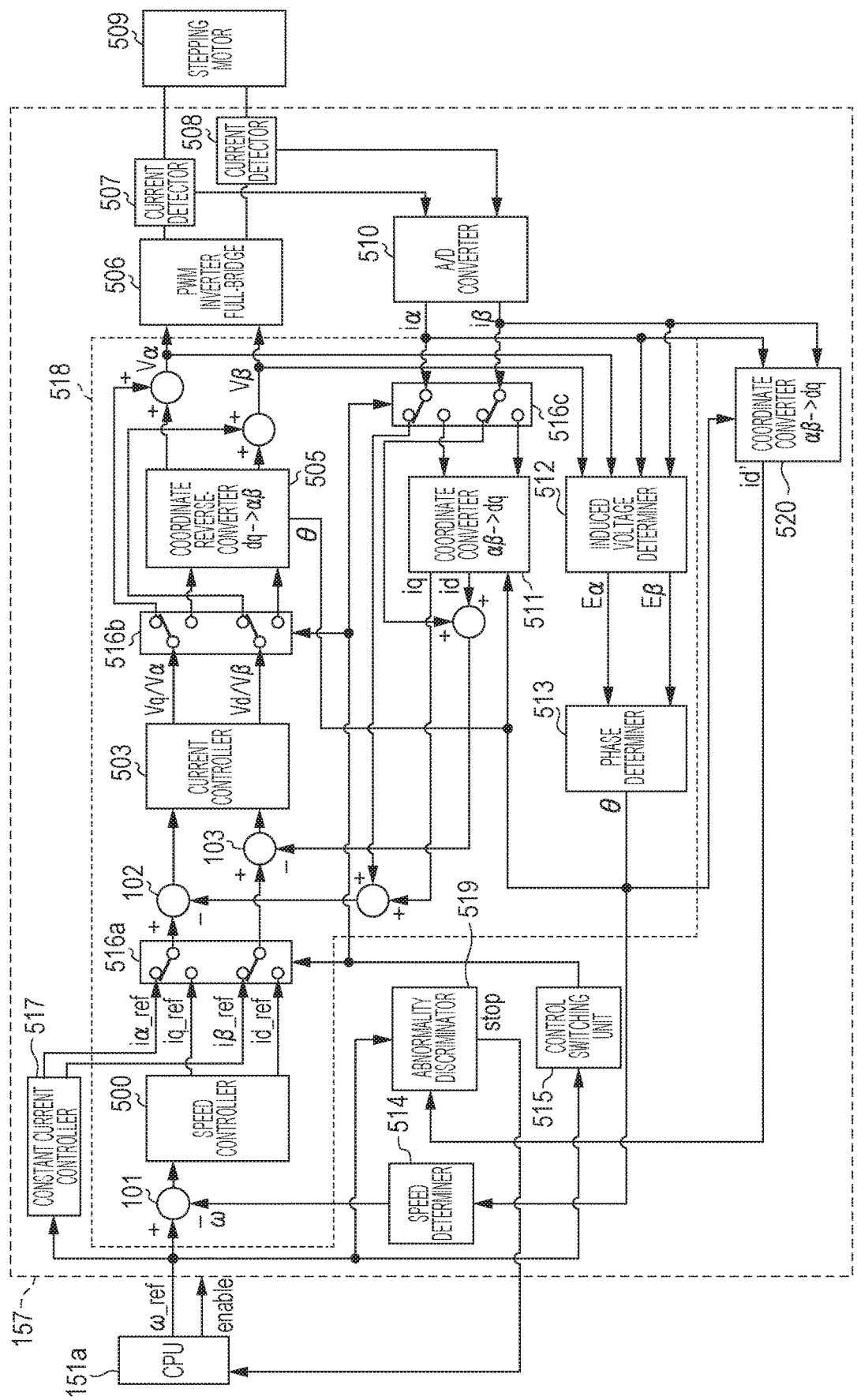
FIG. 11 is a block diagram illustrating a configuration of the motor control device that performs a speed feedback control.

The motor control device according to the first and second embodiments controls the motor 509 by performing a phase feedback control; however, this example does not set any limitation. For example, the configuration of the motor control device may be a configuration that the motor 509 is controlled by feeding back the rotating speed ω of the rotator 402. More specifically, for example, as illustrated in FIG. 11, a speed determiner 514 determines a rotating speed ω based on equation (12), and a speed controller 500 generates and outputs a q axis current instruction value iq_ref and a d axis current instruction value id_ref so that deviation between the instructed speed ω_ref', which represents a target speed of the rotator and the rotating speed ω determined by the speed determiner 514 becomes small. There may be a configuration that the motor 509 is controlled by performing such a speed feedback control. Here, the abnormality discriminator 519 may start a stoppage determination based on a comparison result between the instructed speed ω_ref' and threshold value ωsnl or may start the stoppage determination based on a comparison result between the rotating speed ω and threshold value ωsnl. Further, the control switching unit 515 may switch the constant current control and vector control based on a comparison result between the instructed speed ω_ref' and threshold value ωth or may switch the constant current control and vector control based on a comparison result between the rotating speed ω and threshold value ωth.

Further, the rotating speed ω and rotating speed ω_ref' may be determined based on a cycle that a magnitude of a periodical signal correlated to a rotational cycle of the rotator 402 becomes zero, such as drive current iα or iβ, drive voltage Vα or Vβ, induced voltage Eα or Eβ, or the like, for example.

Further, according to the first and second embodiments, the abnormality discriminator 519 is provided inside the motor control device; however, this example does not set any limitation. For example, the abnormality discriminator 519 may be provided outside the motor control device.

Further, a first control circuit corresponds to a circuit that controls the drive of the motor 509 by using the constant-current controller 517. Further, a second control circuit corresponds to a circuit that controls the driving of the motor 509 by using the vector controller 518. Here, the motor control device according to the present embodiment has a common part (the current controller 503, PWM inverter 506, and the like) between the circuit for a vector control and circuit for a constant current control; however, this example does not set any limitation. For example, a circuit for the vector control and a circuit for the constant current control may be independently provided.

Further, according to the first and second embodiments, a motor having winding in two phases is used; however, other motors such as a motor having three phases may be employed.

According to the disclosure, it can be determined whether or not the motor rotation is abnormal with an inexpensive configuration.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-194431, filed Oct. 4, 2017, which is hereby incorporated by reference herein in its entirety.

What is claimed is:

1. A motor control device comprising:
a detector configured to detect a drive current flowing in a winding of a motor;
a phase determiner configured to determine a rotation phase of a rotator of the motor;
a controller configured to perform control in a first mode for controlling the drive current flowing in the winding so that a deviation between a value of a torque current component of the driving current detected by the detector and a target value of the torque current component becomes small and a deviation between a value of an excitation current component of the driving current detected by the detector and a target value of the excitation current component becomes small, and in a second mode for controlling the drive current flowing in the winding based on a current having a predetermined magnitude, the target value of the torque current component being set so that a deviation between an instructed phase indicating a target phase of the rotator and the rotation phase determined by the phase determiner becomes small, the torque current component being a current component represented in a rotating coordinate system based on the rotation phase of the rotator determined by the phase determiner and being a current component that generates a torque in the rotator, the excitation current component being a current component represented in the rotating coordinate system and being a current component that affects an intensity of a magnetic flux passing through the winding; and
a discriminator configured to discriminate whether or not rotation of the motor is abnormal based on the value of the excitation current component of the drive current detected by the detector in a condition that the second mode is executed and a value corresponding to the rotating speed of the rotator is larger than a predetermined value.

2. A motor control device comprising:
a detector configured to detect a drive current flowing in a winding of a motor;
a phase determiner configured to determine a rotation phase of a rotator of the motor;
a speed determiner configured to determine a rotating speed of the rotator of the motor;
a controller configured to perform control in a first mode for controlling the drive current flowing in the winding so that a deviation between a value of a torque current component of the driving current detected by the detector and a target value of the torque current component becomes small and a deviation between a value of an excitation current component of the driving current detected by the detector and a target value of the excitation current component becomes small, and in a second mode for controlling the drive current flowing in the winding based on a current having a predetermined magnitude, the target value of the torque current component being set so that a deviation between an instructed speed indicating a target speed of the rotator and the rotation speed determined by the speed determiner becomes small, the torque current component being a current component represented in a rotating coordinate system based on the rotation phase determined by the phase determiner and being a current component that generates a torque in the rotator, the excitation current component being a current component represented in the rotating coordinate system and being a current component that affects an intensity of a magnetic flux passing through the winding; and a discriminator configured to discriminate whether or not rotation of the motor is abnormal based on the value of the excitation current component of the drive current detected by the detector in a condition that the second mode is executed and a value corresponding to the rotating speed of the rotator is larger than a predetermined value.

3. The motor control device according to claim 1, wherein the discriminator does not perform a discrimination of abnormality in a condition that the first mode is executed.

4. The motor control device according to claim 1, wherein, the controller switches a control mode for controlling the motor from the second mode to the first mode in a case where the value corresponding to the rotating speed of the rotator changes from a value smaller than a second predetermined value to a value larger than the second predetermined value in a condition that the second mode is executed, the second predetermined value being larger than the predetermined value.

5. The motor control device according to claim 1, further comprising
an induced voltage determiner configured to determine an induced voltage induced, by rotation of the rotator, in the winding, based on the drive current detected by the detector,
wherein the phase determiner determines the rotation phase of the rotator based on a magnitude of the induced voltage determined by the induced voltage determiner.

6. The motor control device according to claim 1, wherein the value corresponding to the rotating speed of the rotator is a value corresponding to a target speed of the rotator.

7. The motor control device according to claim 1, further comprising a speed determiner configured to determine the rotating speed of the rotator,
wherein the value corresponding to the rotating speed of the rotator is a value corresponding to the rotating speed determined by the speed determiner.

8. The motor control device according to claim 1, wherein the abnormal rotation of the motor corresponds to a step-out state of the motor.

9. The motor control device according to claim 2, wherein the controller stops driving of the motor in a case where the discriminator discriminates that the rotation of the motor is abnormal.

10. The motor control device according to claim 2, wherein the controller stops driving of the motor in a case where the discriminator discriminates that the rotation of the motor is abnormal.

11. The motor control device according to claim 2, wherein the discriminator does not perform a discrimination of abnormality in a condition that the first mode is executed.

12. The motor control device according to claim 2, wherein the controller switches a control mode for controlling the motor from the second mode to the first mode in a case where the value corresponding to the rotating speed of the rotator changes from a value smaller than a second predetermined value to a value larger than the second predetermined value in a condition that the second mode is executed, the second predetermined value being larger than the predetermined value.

13. The motor control device according to claim 2, wherein the value corresponding to the rotating speed of the rotator is a value corresponding to a target speed of the rotator.

14. The motor control device according to claim 2, wherein the value corresponding to the rotating speed of the rotator is a value corresponding to the rotating speed determined by the speed determiner.

15. The motor control device according to claim 2, wherein the discriminator discriminates that the rotation of the motor is abnormal in a case where the value of the excitation current component of the drive current detected by the detector is smaller than a threshold value.

16. The motor control device according to claim 2, further comprising
an induced voltage determiner configured to determine an induced voltage induced, by rotation of the rotator, in the winding, based on the drive current detected by the detector,
wherein the phase determiner determines the rotation phase of the rotator based on a magnitude of the induced voltage determined by the induced voltage determiner,
wherein the speed determiner determines the rotation speed of the rotator based on the magnitude of the induced voltage determined by the induced voltage determiner.

17. The motor control device according to claim 2, wherein the abnormal rotation of the motor corresponds to a step-out state of the motor.

18. A motor control device comprising:
a detector configured to detect a drive current flowing in a winding of a motor;
a phase determiner configured to determine a rotation phase of a rotator of the motor;
a controller configured to perform control in a first mode for controlling the drive current flowing in the winding so that a deviation between a value of a torque current component of the driving current detected by the detector and a target value of the torque current component becomes small, and in a second mode for controlling the drive current flowing in the winding based on a current having a predetermined magnitude, the target value of the torque current component being set so that a deviation between an instructed phase indicating a target phase of the rotator and the rotation phase determined by the phase determiner becomes small, the torque current component being a current component represented in a rotating coordinate system based on the rotation phase of the rotator determined by the phase determiner and being a current component that generates a torque in the rotator; and a discriminator configured to discriminate whether or not rotation of the motor is abnormal based on the value of the torque current component of the drive current detected by the detector in a condition that the second mode is executed and a value corresponding to the rotating speed of the rotor is larger than a predetermined value.

19. A motor control device comprising:

a detector configured to detect a drive current flowing in a winding of a motor;

a phase determiner configured to determine a rotation phase of a rotator of the motor;

a speed determiner configured to determine a rotating speed of the rotor of the motor;

a controller configured to perform control in a first mode for controlling the drive current flowing in the winding so that a deviation between a value of a torque current component of the driving current detected by the detector and a target value of the torque current component becomes small, and in a second mode for controlling the drive current flowing in the winding based on a current having a predetermined magnitude, the target value of the torque current component being set so that a deviation between an instructed phase indicating a target phase of the rotator and the rotation phase determined by the phase determiner becomes small, the torque current component being a current component represented in a rotating coordinate system based on the rotation phase determined by the phase determiner and being a current component that generates a torque in the rotator; and a discriminator configured to discriminate whether or not rotation of the motor is abnormal based on the value of the torque current component of the drive current detected by the detector in a condition that the second mode is executed and a value corresponding to the rotating speed of the rotor is larger than a predetermined value.

20. A motor control device comprising:

a detector configured to detect a drive current flowing in a winding of a motor;

a phase determiner configured to determine a rotation phase of a rotator of the motor based on the drive current detected by the detector;

a controller configured to control the motor based on a current having a predetermined magnitude; and a discriminator configured to discriminate whether or not rotation of the motor is abnormal based on a value of the excitation current component of the drive current detected by the detector in a condition that a value corresponding to a rotating speed of the rotor of the motor controlled by the controller is larger than a predetermined value, the excitation current component being a current component represented in a rotating coordinate system based on the rotation phase determined by the phase determiner and being a current component that affects an intensity of a magnetic flux passing though the winding.

21. A motor control device comprising:

a detector configured to detect a drive current flowing in a winding of a motor;

a phase determiner configured to determine a rotation phase of a rotator of the motor based on the drive current detected by the detector;

a controller configured to control the motor based on a current having a predetermined magnitude; and a discriminator configured to discriminate whether or not rotation of the motor is abnormal based on a value of the torque current component of the drive current detected by the detector in a condition that a value corresponding to the rotating speed of the rotator of the motor controlled by the controller is larger than a predetermined value, the torque current component being a current component represented in a rotating coordinate system based on the rotation phase determined by the phase determiner and being a current component which generates a torque in the rotator.

22. An image forming apparatus comprising:

an image forming unit configured to form an image on a sheet;

a motor configured to drive a load;

a detector configured to detect a drive current flowing in a winding of the motor;

a phase determiner configured to determine a rotation phase of a rotator of the motor based on the drive current detected by the detector;

a controller configured to perform control in a first mode for controlling the drive current flowing in the winding based on a torque current component so that deviation between an instructed phase indicating a target phase of the rotator and the rotation phase determined by the phase determiner becomes small, and in a second mode for controlling the drive current flowing in the winding based on a current having a predetermined magnitude, the torque current component being a current component represented in a rotating coordinate system based on the rotation phase of the rotator and being a current component becomes small, which generates a torque in the rotator; and an outputter configured to output a signal, which indicates that a value of an excitation current component of the drive current is equal to or smaller than a threshold value, when the value of the excitation current component of the drive current detected by the detector is equal to or smaller than the threshold value in a condition that the second mode is executed and a value corresponding to the rotating speed of the rotor is larger than a predetermined value, the excitation current component being a current component represented in the rotating coordinate system and being a current component that affects an intensity of a magnetic flux passing through the winding.

23. The image forming apparatus according to claim 22, wherein the load is a conveyance roller for conveying the sheet, and the image forming unit forms an image on the sheet conveyed by the conveyance roller.

24. The image forming apparatus according to claim 22, wherein the controller stops driving of the motor when a signal indicating that a value of an excitation current component of the drive current is equal to or smaller than a threshold value is output from the outputter.

25. The image forming apparatus according to claim 22, further comprising a notification unit configured to notify a user of information, wherein, when a signal indicting that a value of an excitation current component of the drive current is equal to or smaller than a threshold value is output from the outputter, the controller notifies information that the value of the excitation current component of the drive current is equal to or smaller than the threshold value via the notification unit.

26. The motor control device according to claim 1, wherein the discriminator discriminates that the rotation of the motor is abnormal in a case where the value of the excitation current component of the drive current detected by the detector is smaller than a threshold value.

* * * * *